(12) United States Patent
Wang et al.

(10) Patent No.: US 10,932,280 B2
(45) Date of Patent: Feb. 23, 2021

(54) WIRELESS DEVICE AND WIRELESS COMMUNICATION METHOD FOR SCHEDULING ASSIGNMENT MESSAGE TRANSMISSION

(71) Applicant: Panasonic Intellectual Property Corporation of America, Torrance, CA (US)

(72) Inventors: Lilei Wang, Beijing (CN); Hidetoshi Suzuki, Kanagawa (JP); Joachim Loehr, Hessen (DE); Sujuan Feng, Hessen (DE); Masayuki Hoshino, Chiba (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 19 days.

(21) Appl. No.: 15/768,481

(22) PCT Filed: Nov. 5, 2015

(86) PCT No.: PCT/CN2015/093894
§ 371 (c)(1),
(2) Date: Apr. 13, 2018

(87) PCT Pub. No.: WO2017/075783
PCT Pub. Date: May 11, 2017

(65) Prior Publication Data
US 2018/0317239 A1     Nov. 1, 2018

(51) Int. Cl.
*H04W 72/12*     (2009.01)

(52) U.S. Cl.
CPC ....... *H04W 72/12* (2013.01); *H04W 72/1278* (2013.01)

(58) Field of Classification Search
None
See application file for complete search history.

(56) References Cited

U.S. PATENT DOCUMENTS

2013/0294369 A1* 11/2013 Dinan ..................... H04L 5/001
370/329
2016/0249344 A1* 8/2016 Schlienz ........... H04W 72/0413
(Continued)

FOREIGN PATENT DOCUMENTS

EP     3113566 A1    1/2017
JP     2015-185959 A    10/2015
(Continued)

OTHER PUBLICATIONS

International Search Report of PCT application No. PCT/CN2015/093894 dated Jul. 25, 2016.
(Continued)

*Primary Examiner* — Anh Ngoc M Nguyen
(74) *Attorney, Agent, or Firm* — Seed IP Law Group LLP

(57) ABSTRACT

Provided are a wireless device and a wireless communication method in a wireless communication network comprising multiple wireless devices capable of communicating with each other directly, the wireless device comprising: a processing circuitry operative to multiplex data with a scheduling assignment message, into transmission information; and a transmitter operative to transmit the transmission information in a scheduling assignment period, to another wireless device in the wireless communication network, wherein the scheduling assignment message is used for indicating data transmission resource in the scheduling assignment period or in a previous scheduling assignment period.

16 Claims, 5 Drawing Sheets

(56) References Cited

U.S. PATENT DOCUMENTS

| | | | | |
|---|---|---|---|---|
| 2016/0338095 | A1* | 11/2016 | Faurie | H04W 28/0278 |
| 2016/0360541 | A1 | 12/2016 | Kim et al. | |
| 2017/0019937 | A1* | 1/2017 | Kim | H04W 8/26 |
| 2017/0094702 | A1 | 3/2017 | Yasukawa et al. | |
| 2017/0118765 | A1* | 4/2017 | Kalhan | H04B 7/2615 |
| 2017/0135075 | A1* | 5/2017 | Jiang | H04W 72/1273 |
| 2017/0251485 | A1* | 8/2017 | Kalhan | H04W 72/08 |
| 2017/0280469 | A1* | 9/2017 | Park | H04W 24/10 |
| 2018/0176892 | A1 | 6/2018 | Kim et al. | |
| 2018/0234220 | A1 | 8/2018 | Yasukawa et al. | |

FOREIGN PATENT DOCUMENTS

| | | |
|---|---|---|
| JP | 2017-508423 A | 3/2017 |
| JP | 2017-509261 A | 3/2017 |
| JP | 2017-516361 A | 6/2017 |
| WO | 2015/020448 A1 | 2/2015 |
| WO | 2015/122630 A1 | 8/2015 |
| WO | 2015/130060 A1 | 9/2015 |
| WO | 2015/142113 A1 | 9/2015 |
| WO | 2015/152581 A1 | 10/2015 |
| WO | 2016/159712 A1 | 10/2016 |
| WO | 2017/026511 A1 | 2/2017 |

OTHER PUBLICATIONS

Extended European Search Report, dated Sep. 28, 2018, for the related European Patent Application No. 15907625.6, 12 pages.

LG Electronics: "Discussion on resource structure for PC5-based V2V", 3GPP Draft; R1-155416 Discussion on Resource Structure for PC5-Based V2V_LG, 3rd Generation Partnership Project (3GPP), Mobile Competence Centre ; 650, Route Des Lucioles ; F-06921 Sophia-Antipolis CE, vol. RAN WG1, No. Malmo, Sweden; Oct. 5, 2015-Oct. 9, 2015 Oct. 4, 2015 (Oct. 4, 2015), XP051002322, Retrieved from the Internet: URL:http://www.3gpp.org/ftp/Meetings_3GPP_SYNC/RAN1/Docs/ [retrieved on Oct. 4, 2015].

CATT: "Physical layer channel design enhancement to support resource allocation in PC5-based V2V", 3GPP Draft; R1-155222, 3rd Generation Partnership Project (3GPP), Mobile Competence Centre ; 650, Route Des Lucioles ; F-06921 Sophia-Antipolis Cedex ; France, vol. RAN WG1, No. Malmo, Sweden; Oct. 5, 2015-Oct. 9, 2015 Oct. 4, 2015 (Oct. 4, 2015), XP051002189, Retrieved from the Internet: URL:http://www.3gpp.org/ftp/Meetings_3GPP_SYNC/RAN1/Docs/ [retrieved on Oct. 4, 2015].

Huawei et al: "Multiplexing of SA and data", 3GPP Draft; R1-156101, 3rd Generation Partnership Project (3GPP), Mobile Competence Centre ; 650, Route Des Lucioles ; F-06921 Sophia-Antipolis Cedex ; France, vol. RAN WG1, No. Malmo, Sweden; Oct. 5, 2015-Oct. 9, 2015 Oct. 7, 2015 (Oct. 7, 2015), XP051021958, Retrieved from the Internet: URL:http://www.3gpp.org/ftp/tsg_ran/WG1_RL1/TSGR1_82b/Docs/ [retrieved on Oct. 7, 2015].

Fujitsu: "Further analysis on control signal and Scheduling Assignment for D2D communication", 3GPP Draft; R1-141229_D2D_CTRL_ Signal, 3rd Generation Partnership Project (3GPP), Mobile Competence Centre ; 650, Route Des Lucioles ; F-06921 Sophia-Antipolis Cedex ; France, vol. RAN WG1, No. Shenzhen, China; Mar. 31, 2014-Apr. 4, 2014 Mar. 30, 2014 (Mar. 30, 2014), XP050786904, Retrieved from the Internet: URL:http://www.3gpp.org/ftp/Meetings_3GPP_SYNC/RAN1/Docs/ [retrieved on Mar. 30, 2014].

ZTE, Resource allocation enhancement for V2V based on PC5, 3GPP TSG-RAN WG1#82b R1-155231, Sep. 28, 2015, Internet <URL:http://www.3gpp.org/ftp/tsg_ran/WG1_RL1/TSGR1_82b/Docs/R1-155231.zip>.

Qualcomm Incorporated, V2V System Level Performance, 3GPP TSG-RAN WG1#82b R1-155755, Sep. 26, 2015, Internet <URL:http://www.3gpp.org/ftp/tsg_ran/WG1_RL1/TSGR1_82b/Docs/R1-155755.zip>.

Huawei, HiSilicon, Impact of SA transmissions, 3GPP TSG-RAN WG1#82 R1-154361, Aug. 15, 2015, Internet <URL: http://www.3gpp.org/ftp/tsg_ran/WG1_RL1/TSGR1_82/Docs/R1-154361.zip>.

Ericsson, Discussion on V2V Scheduling, Resource Pools and Resource Patterns, 3GPP TSG-RAN WG1#82b R1-155909, Sep. 25, 2015, Internet <URL:http://www.3gpp.org/ftp/tsg_ran/WG1_RL1/TSGR1_82b/Docs/R1-155909.zip>.

Australian Office Action dated Jul. 24, 2020 for the related Australia Patent Application No. 2015414016, 6 pages.

* cited by examiner

WIRELESS DEVICE AND WIRELESS COMMUNICATION METHOD FOR SCHEDULING ASSIGNMENT MESSAGE TRANSMISSION

BACKGROUND

1. Technical Field

The present disclosure relates to the field of wireless communication, and in particular, to a wireless device and a wireless communication method.

2. Description of the Related Art

V2X means a communication between vehicles (V2V), a communication between vehicle and pedestrian (V2P), a communication between vehicle and infrastructure (V2I) or a communication between vehicle and network (V2N). Compared with D2D (Device to Device) scenario, V2X has two different properties: 1) relatively higher speed, up to 120 km/h or even larger; 2) relatively higher UE (User Equipment) density within the group. Due to the above properties, especially the second property, resource allocation has become one of critical issues discussed in 3GPP (the 3rd Generation Partner Project) so far.

SUMMARY

One non-limiting and exemplary embodiment provides a resource allocation mechanism in a wireless communication network comprising multiple wireless devices capable of communicating with each other directly, such as in a V2X network.

In a first general aspect of the present disclosure, there is provided a wireless device in a wireless communication network comprising multiple wireless devices capable of communicating with each other directly, comprising: a processing circuitry operative to multiplex data with a scheduling assignment message, into transmission information; and a transmitter operative to transmit the transmission information in a scheduling assignment period, to another wireless device in the wireless communication network, wherein the scheduling assignment message is used for indicating data transmission resource in the scheduling assignment period or in a previous scheduling assignment period.

In a second general aspect of the present disclosure, there is provided a wireless device in a communication network comprising multiple wireless devices capable of communicating with each other directly, comprising: a receiver operative to receive transmission information in a scheduling assignment period, from another wireless device in the communication network; and a processing circuitry operative to de-multiplex a scheduling assignment message from the transmission information, and to decode data from the transmission information based on the scheduling assignment message, wherein the scheduling assignment message is used for indicating data transmission resource in the scheduling assignment period or in a previous scheduling assignment period.

In a third general aspect of the present disclosure, there is provided a wireless communication method of a wireless device in a wireless communication network comprising multiple wireless devices capable of communicating with each other directly, the communication method comprising: multiplexing data with a scheduling assignment message, into transmission information; and transmitting the transmission information in a scheduling assignment period, to another wireless device in the communication network, wherein the scheduling assignment message is used for indicating data transmission resource in the scheduling assignment period or in a previous scheduling assignment period.

In a fourth general aspect of the present disclosure, there is provided a wireless communication method of a wireless device in a wireless communication network comprising multiple wireless devices capable of communicating with each other directly, the communication method comprising: receiving transmission information in a scheduling assignment period, from another wireless device in the communication network; de-multiplexing a scheduling assignment message from the transmission information, and decoding data from the transmission information based on the scheduling assignment message, wherein the scheduling assignment message is used for indicating data transmission resource in the scheduling assignment period or in a previous scheduling assignment period.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered as a limitation to its scope, the disclosure will be described with additional specificity and detail through use of the accompanying drawings, in which:

DETAILED DESCRIPTION

Figure 1:
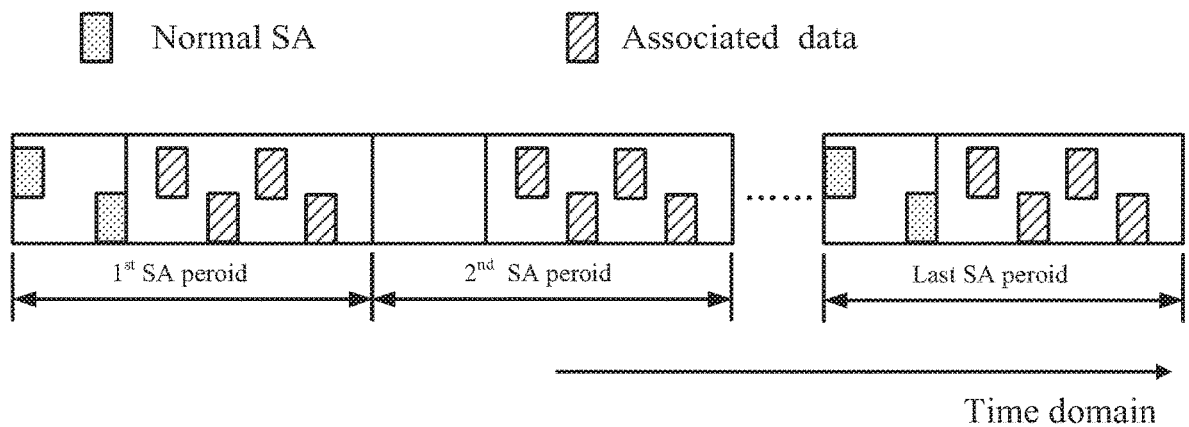
FIG. 1 is a schematic diagram illustrating a resource allocation mechanism in a wireless device according to an embodiment of the present disclosure.

In the following detailed description, reference is made to the accompanying drawings, which form a part thereof. In the drawings, similar symbols typically identify similar components, unless context dictates otherwise. It will be readily understood that the aspects of the present disclosure can be arranged, substituted, combined, and designed in a wide variety of different configurations, all of which are explicitly contemplated and make part of this disclosure.

In a V2X communication network, as described above, there may be many wireless devices having relatively faster speed, such as vehicles or the like, within a group, therefore, on one hand, many vehicles may collide in the same resource pool, and on the other hand, they cannot listen to others due to half duplex restriction.

In an embodiment of the present disclosure, a wireless device is provided, which is applied in a wireless communication network comprising multiple wireless devices capable of communicating with each other directly, such as in the V2X communication network or the D2D communication network. Considering the potentially crowded scheduling assignment (SA) resource pool, the wireless device according to the embodiment of the present disclosure adopts a mechanism similar to a semi-static or semi-persistent scheduling (SPS) mechanism in LTE (Long-Time Evolution), which is referred to as a SPS like mechanism throughout the specification. Hereinafter, the details of the SPS like mechanism will be described with reference to FIG. 1.

FIG. 1 is a schematic diagram illustrating the resource allocation mechanism in the wireless device according to the embodiment of the present disclosure. As shown in FIG. 1, there are multiple SA periods. In the first SA period, a SA message, which is indicated by a block in dots, is transmitted, and associated data, which is indicated by a block in slash, is transmitted accordingly. The SA message is used for indicating initiation of SPS like transmission. In middle SA periods such as the second SA period, there is no SA message transmitted. In the last SA period, a SA message is transmitted to indicate the termination of the SPS like transmission. Further, the SA message transmitted in the first SA period is used to indicate data transmission resource in each of the multiple SA periods.

FIG. 1 shows a first example of the resource allocation mechanism, in which a SA message is transmitted in the first SA period to indicate the start of the SPS like transmission, another SA message is transmitted in the last SA period to indicate the termination of the SPS like transmission, and no SA messages are transmitted in the middle SA periods. In a second example not shown, a SA message is transmitted in the first SA period to indicate information related to the SPS like transmission, such as the time period or the like, and no SA messages are transmitted in the SA periods other than the first SA period. The SA message transmitted in the first SA period is further used to indicate data transmission resource in each of the multiple SA periods.

In either of the above examples, since no SA messages are transmitted in some of the SA periods (the middle SA periods in the first example, and the SA periods other than the first SA period in the second example), generally, quite a lot of SA messages may be saved during the SPS like transmission, thereby the SA collision may be reduced and the half duplex issue may be relaxed in SA resource pool, which means UE or vehicle has more chances to receive messages from other UEs or vehicles.

However, since a topology of the network may change often and the wireless devices may often join or leave the network, especially in the V2X scenario, in the SPS like transmission as shown in FIG. 1, the wireless device newly joining in the network during the SA periods in which no SA messages are transmitted, cannot decode the data due to a lack of SA messages.

To further solve the above problem, in another embodiment of the present disclosure, a wireless device is provided, which is applied in a wireless communication network comprising multiple wireless devices capable of communicating with each other directly, such as in the V2X communication network or the like.

Figure 2:
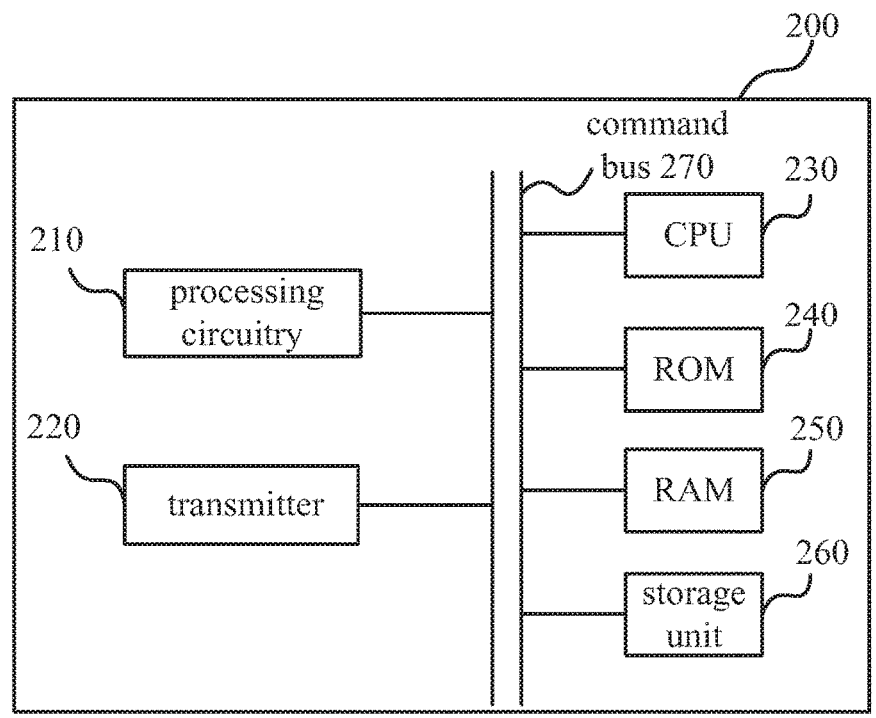
FIG. 2 is a block diagram schematically illustrating a wireless device according to an embodiment of the present disclosure.

FIG. 2 is a block diagram schematically illustrating the wireless device according to the embodiment of the present disclosure.

The wireless device 200 can comprise a processing circuitry 210 operative to multiplex data with a scheduling assignment message, into transmission information; and a transmitter 220 operative to transmit the transmission information in a scheduling assignment period, to another wireless device in the wireless communication network. The scheduling assignment message may be used for indicating data transmission resource in the scheduling assignment period. Alternatively, the scheduling assignment message may also be used for indicating data transmission resource in a previous scheduling assignment period. That means receiving wireless device needs to buffer the data and decode it after such device has successfully received scheduling assignment message in the next scheduling assignment period, which will be described in detail with reference to FIG. 3.

The wireless device 200 according to the present disclosure may optionally include a CPU (Central Processing Unit) 230 for executing related programs to process various data and control operations of respective units in the wireless device 200, a ROM (Read Only Memory) 240 for storing various programs required for performing various process and control by the CPU 230, a RAM (Random Access Memory) 250 for storing intermediate data temporarily produced in the procedure of process and control by the CPU 230, and/or a storage unit 260 for storing various programs, data and so on. The above processing circuitry 210, transmitter 220, CPU 230, ROM 240, RAM 250 and/or storage unit 260 etc. may be interconnected via data and/or command bus 270 and transfer signals between one another.

Respective components as described above do not limit the scope of the present disclosure. According to one implementation of the disclosure, the functions of the above processing circuitry 210 and transmitter 220 may be implemented by hardware, and the above CPU 230, ROM 240, RAM 250 and/or storage unit 260 may not be necessary. Alternatively, the functions of the above processing circuitry 210 and transmitter 220 may also be implemented by functional software in combination with the above CPU 230, ROM 240, RAM 250 and/or storage unit 260 etc.

Figure 3:
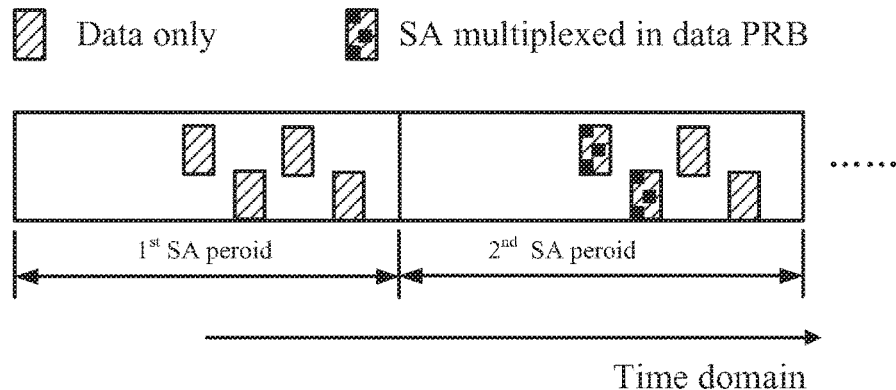
FIG. 3 is a schematic diagram illustrating another resource allocation mechanism in a wireless device according to an embodiment of the present disclosure.

Hereinafter, the scheduling assignment mechanism adopted by the wireless device 200 will be described with reference to FIG. 3. FIG. 3 is a schematic diagram illustrating another resource allocation mechanism in a wireless device according to an embodiment of the present disclosure.

As shown in FIG. 3, there are multiple SA periods, similar to those in FIG. 1. The difference between the present embodiment and the embodiment shown in FIG. 1 lies in that, there is a dedicated SA region in FIG. 1 for transmitting the SA message; while there may not be a dedicated SA region in the present embodiment as shown in FIG. 3, in which all subframes in a scheduling assignment period can potentially transmit data.

Further, the difference between the present embodiment and the embodiment shown in FIG. 1 lies in that, in FIG. 3, the SA message is multiplexed with the data into transmission information, which is indicated by blocks filled with dark squares. The transmission information is transmitted in a SA period, for example, the second SA period as shown in FIG. 3, to another wireless device.

The multiplexing of the SA message and the data may be indicated by a wireless device through a broadcast channel, such as Physical Sidelink Broadcast Channel (PSBCH) or the like. The wireless device may be the present wireless device or other wireless devices in the communication network, as long as it may function as a synchronizing source.

In a possible implementation, the SA message is used for indicating data transmission resource in the present SA period, when the current data transmission resource (e.g., subframe) is allowed to transmit the transmission information.

In another possible implementation, when the current subframe is not allowed to transmit the transmission information, data may be transmitted first, for example, in a previous SA period such as the first SA period in FIG. 3, and then the multiplexed SA message is transmitted, for example, in a following SA period such as the second SA period in FIG. 3. In such a case, the SA message is used for indicating data transmission resource in the previous SA period. For the receiving wireless device, some subframes may be buffered, and the data may be decoded after the multiplexed SA message is detected. The start of the data may be indicated by the multiplexed SA message. In such implementation, the wireless device may transmit data quickly and the latency may be reduced.

Figure 4:
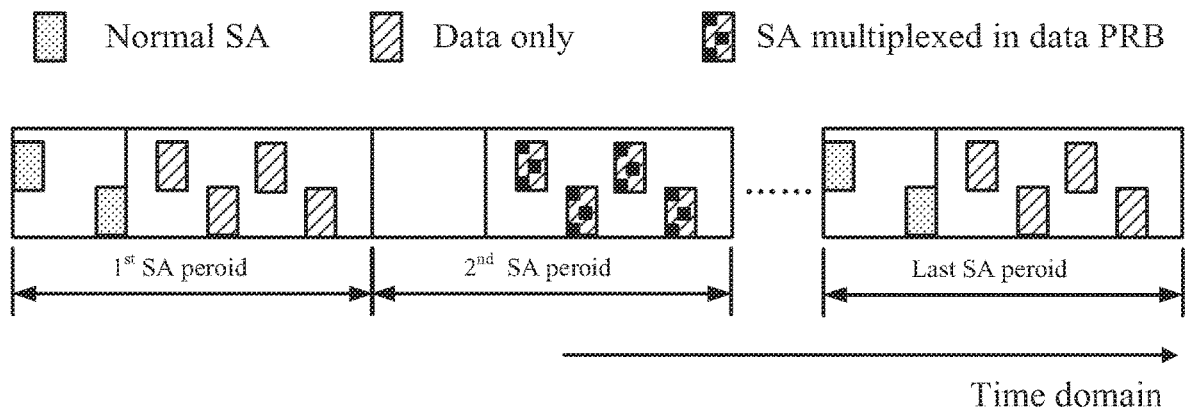
FIG. 4 is a schematic diagram illustrating a further resource allocation mechanism in a wireless device according to an embodiment of the present disclosure.

FIG. 4 is a schematic diagram illustrating a further scheduling assignment mechanism according to an embodiment of the present disclosure. The scheduling assignment mechanism in FIG. 4 also adopts the SPS like mechanism, as described with reference to FIG. 1. The difference between the present embodiment and the embodiment shown in FIG. 1 lies in that, there is no SA message transmitted in middle SA periods in FIG. 1; while the SA message multiplexed with the data is transmitted in the middle SA periods in the present embodiment. It should be noted that although the transmission information is transmitted in the middle SA periods as shown in FIG. 4, in another example not shown, it may be transmitted in both the middle SA periods and the last SA period. That is, the SA message is multiplexed with data into transmission information as shown, and the transmission information is transmitted in the data transmission resource of at least one SA period other than the first SA period. Each of the multiple SA periods comprises a data region. The data transmission resource in each data region is indicated by the SA message.

The SA message may be multiplexed with the data in various ways. For example, the processing circuitry may embed the resource elements of SA message into the data resource in a physical layer, to form the transmission information, in which relevant resource elements of data resource is punctured. For another example, the processing circuitry may map the SA message into a part of the data transmission resource, such as one slot of a subframe, and map the data into the other part of the data transmission resource, such as the other slot of the subframe, to form the transmission information, in which a coding rate of the data is matched within the other part, such as the other slot, transmitting the data.

Further, as shown in FIG. 4, the first SA period comprises a SA region in which another SA message for indicating the data transmission resource is transmitted. Particularly, a field or a combination of several fields may be added into said another SA message to indicate parameters related to the SPS like transmission, for example, to indicate the start of the SPS like transmission, the time period of the SPS like transmission, the time/frequency resource of SPS or the like. Alternatively, a different RNTI (Radio Network Temporary Identity) may be used to indicate the SPS like transmission.

Regarding the format of the SA message multiplexed with the data in the data region, which may be referred to as the multiplexed SA message hereinafter, there may be several options. In a first option, the format of the multiplexed SA message may be the same as that of said another SA message transmitted in the first SA period, which may be referred to as the normal SA message hereinafter. For example, the Sidelink Control Information (SCI) format 0 may be reused.

In a second option, the format of the multiplexed SA message may be more simplified as compared to that of the normal SA message. For example, a resource allocation field in the normal SA message may be removed or reduced in size, since the position of the multiplexed SA message may reflect the position of the data.

For another example, a timing advance field in the normal SA message may be removed, since the data and the multiplexed SA message are operated in the same data resource, that is, they use the same timing advance. Particularly, the transmitter may be operative to transmit the transmission information using a downlink timing which is based on reception timing from another wireless device and has not timing advance, in both an eNode B scheduling transmission, like the mode 1 transmission in the D2D network, and a UE autonomous scheduling transmission, like the mode 2 transmission in the D2D network. Alternatively, in case of the eNode B scheduling transmission and V2X is operated in cellular carrier, a timing advance may be applied to the first SA period.

For a further example, a time resource pattern (T-RPT) field in the normal SA message may be removed or reduced in size, since the multiplexed SA message may reflect certain T-RPT index, as described later with reference to FIG. 5.

The SPS like transmission may be enabled or disabled by a wireless device, and may be indicated through a broadcast channel, such as PSBCH or the like. The wireless device may be the present wireless device or other wireless devices in the communication network, as long as it may function as a synchronizing source.

Additionally, by an indication of the multiplexed SA message, transmission properties, such as MCS (modulation and coding scheme) or the like, may be adapted.

Further, in the SPS like transmission, the data transmission resource may be selected by the wireless device once in the first SA period, when the transmission from the wireless device to the other wireless device is scheduled by the wireless device autonomously. That is, in a case of the UE autonomous scheduling transmission, the wireless device may transmit the normal SA message in the first SA period and the multiplexed SA message in the following SA periods, and the wireless device just selects resource (SA or data) once in the first SA period. The resource will be repeated in the following SA periods.

Alternatively, the data transmission resource may be selected by a base station when the transmission from the wireless device to the other wireless device is scheduled by the base station. That is, in a case of the eNode B based scheduling transmission, similarly, the wireless device may transmit the normal SA message in the first SA period and the multiplexed SA message in the following SA periods. However, different from that in the above case, the resource selection will follow the eNode B's guidance. Further, in an embodiment, the time position to transmit the multiplexed SA message in a SA period may be limited. FIG. 5 is a diagram schematically showing a position of a multiplexed SA message in time domain according to an embodiment of the present disclosure. As shown in FIG. 5, the time position of the multiplexed SA message may be limited to first few "1" subframes the second T-RPT bitmap indicates. Particularly, in FIG. 5, the value of the bitmap is, for example, "11100100" which means subframes #1, #2, #3 and #6 in slash are available for transmission. Such bitmap is repeated to the end of the SA period and a truncated bitmap is used for the last few subframes, as shown in FIG. 5. The usage of the bitmap is common for all UEs so that the receiving wireless device and the transmitting wireless device know when to apply the first bitmap, the second bitmap, and so on. Those skilled in the art shall understand that the value of the bitmap shown in FIG. 5 is only an example, and other values of the bitmap are also possible.

Figure 5:
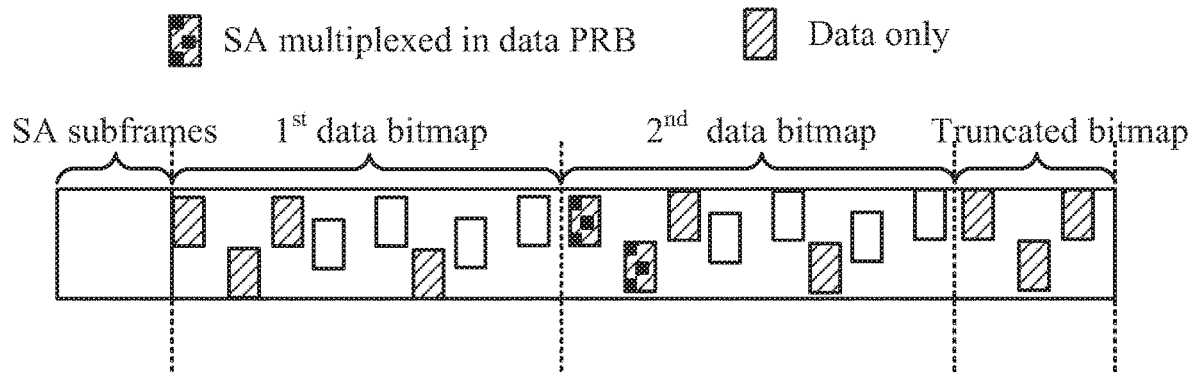
FIG. 5 is a schematic diagram illustrating a position of a multiplexed SA message in time domain according to an embodiment of the present disclosure.

As shown in FIG. 5, the starting subframe to apply the T-RPT pattern is aligned between the multiplexed SA message and the data. As the timing to apply T-RPT pattern is cell-specific or group-specific, the transmitting wireless device and the receiving wireless device have the same understanding on the time to transmit the multiplexed SA message. The transmitter may be operative to transmit the transmission information in part of subframes applying time resource pattern (T-PRT) in a SA period. The part of subframes may be specified, predefined or configured depending on resource allocation mode (eNode B scheduled or UE autonomous selection). The receiver does not know the value of the bitmap in advance, so it will presume one value of bitmap (time resource pattern), for example "11100100", and attempt to detect the multiplexed SA message. In order to reduce the decoding complexity, it is possible to restrict part of the T-RPT patterns to transmit the multiplexed SA message.

Additionally, in frequency domain, the multiplexed SA message may be transmitted in various ways. As an example, the multiplexed SA message may be transmitted in one PRB in a subframe. As another example, the multiplexed SA message may be transmitted repeatedly in all allocated PRBs in a subframe. As a further example, the same multiplexed SA message may be transmitted cross several PRBs in a subframe.

Figure 6:
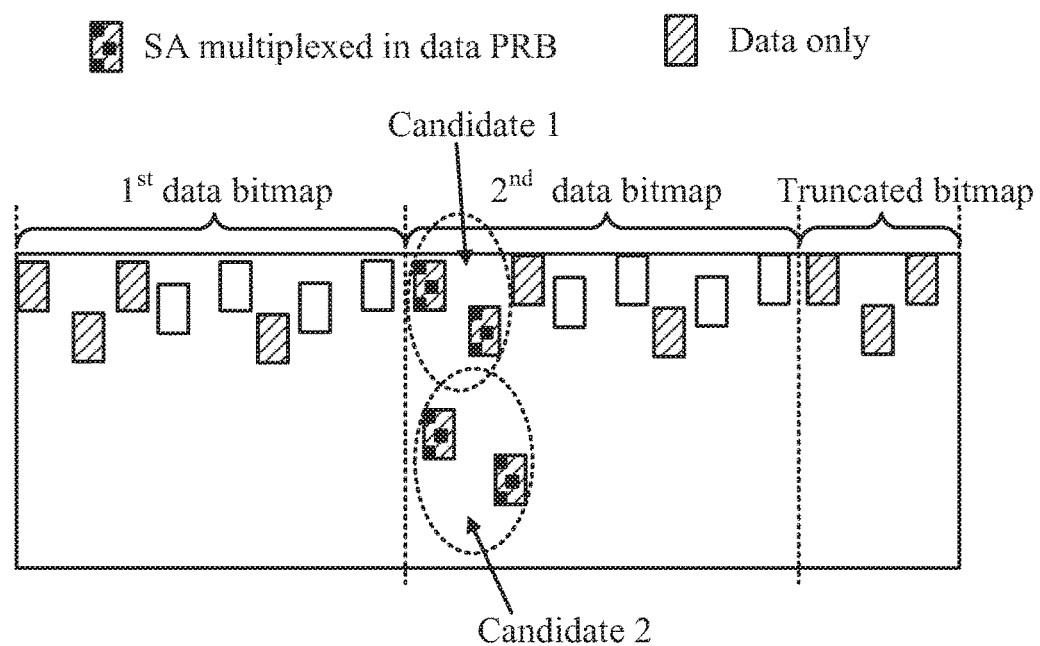
FIG. 6 is a schematic diagram illustrating a position of a multiplexed SA message in frequency domain according to an embodiment of the present disclosure.

Further, in an embodiment, the frequency position to transmit the multiplexed SA message in a SA period may be also limited. FIG. 6 is a diagram schematically showing a position of a multiplexed SA message in frequency domain according to an embodiment of the present disclosure. As an example, the frequency position of the multiplexed SA message may be linked with the T-RPT pattern. For example, if the T-RPT pattern is "11100100", the first PRB (Physical Resource Block) is used for transmitting the multiplexed SA message. If the T-RPT pattern is "11000000", the third PRB is used for transmitting the multiplexed SA message. That is, different T-RPT pattern is linked with different frequency position of the multiplexed SA message. Therefore, the transmitter may be operative to transmit the transmission information in a PRB of the data transmission resource, an index of the PRB being associated with a T-RPT index of the data transmission resource.

For the receiving wireless device, it may presume certain T-RPT pattern and attempt to detect the multiplexed SA message. If the multiplexed SA message is detected, the T-RPT pattern is also known accordingly. In FIG. 6, a candidate 1 is linked with the T-RPT pattern 1 and a candidate 2 is linked with the T-RPT pattern 2. For the transmitting wireless device, the frequency resource allocation should include corresponding linked PRB to transmit the multiplexed SA message. Therefore, in such example, the complexity of the receiving wireless device may be reduced, but there may be some restriction on resource allocation in frequency domain.

As another example, the frequency position of the multiplexed SA message may be fixed regardless of the T-RPT pattern. That is, the transmitter may be operative to transmit the transmission information in a fixed PRB of the data transmission resource. For example, PRBs 1 and 13 may always be the possible candidates to transmit the multiplexed SA message. In such a case, the data resource should include one of the candidate PRBs.

It is to be noted that although the multiplexed SA message is described in a SPS like resource allocation scenario in the present embodiment, the present disclosure is not limited thereto, and may be applied to a dynamic resource allocation or even in a scenario without a SA resource pool as shown in FIG. 3.

Further, it is to be noted that, in any of the above figures, the SA channel used for transmitting one SA message or the data channel used for transmitting one transport block is repeated. Between or among the repeated SA channels or the repeated data channels, a certain hopping rule may be applied. For example, in FIG. 4, the SA channel is repeated twice, the data channel is repeated four times, and the multiplexed SA message is transmitted in four repeated data channels. However, it is just an example, and the present disclosure is not limited thereto. Those skilled in the art shall understand that the SA channel and the data channel may be repeated other times than those shown in the figures, and the multiplexed SA message may be transmitted in any one or more of the repeated data channels.

The resource allocation mechanisms, which have been described above with reference to FIGS. 3-6, may be applied to both the eNode B scheduled transmission, like the mode 1 transmission in the D2D network, and the UE autonomous transmission, like the mode 2 transmission in the D2D network. By multiplexing the SA message with the data and transmitting the SA message multiplexed with the data together in the data channel, the SA resource pool may be relaxed, and the newly joined UE will not miss any data transmitted in any SA period other than the first SA period.

Figure 7:
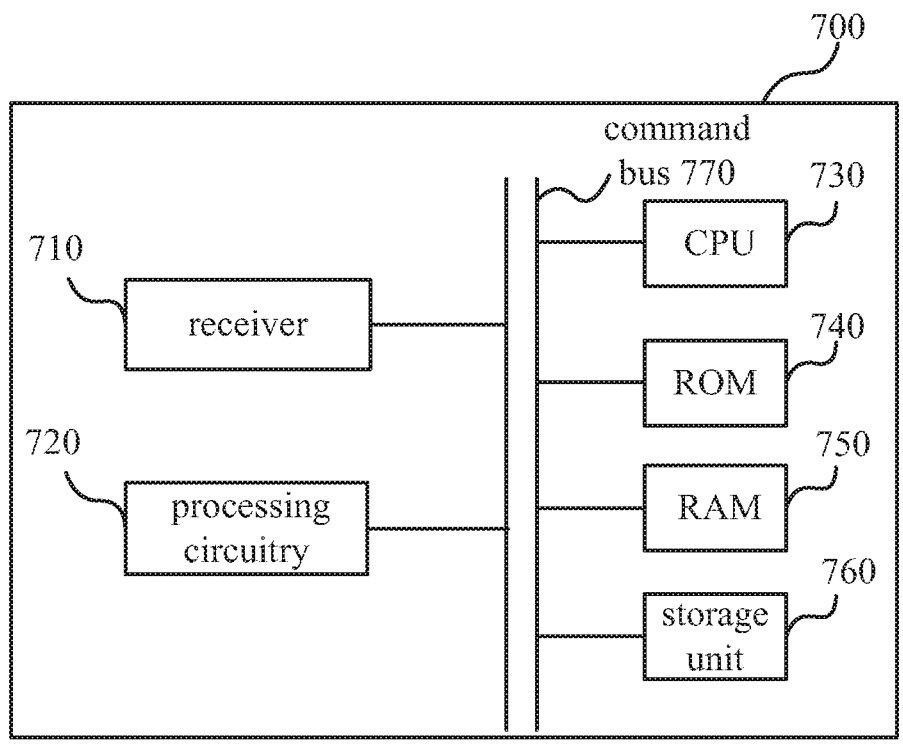
FIG. 7 is a block diagram schematically illustrating a wireless device according to another embodiment of the present disclosure.

FIG. 7 is a block diagram schematically illustrating a wireless device according to an embodiment of the present disclosure.

The wireless device 700 can comprise a receiver 710 operative to receive transmission information in a scheduling assignment period, from another wireless device in the communication network; and a processing circuitry 720 operative to de-multiplex a scheduling assignment message from the transmission information, and to decode data from the transmission information based on the scheduling assignment message. The scheduling assignment message may be used for indicating data transmission resource in the scheduling assignment period. Alternatively, the scheduling assignment message may also be used for indicating data transmission resource in a previous scheduling assignment period.

The wireless device 700 according to the present disclosure may optionally include a CPU (Central Processing Unit) 730 for executing related programs to process various data and control operations of respective units in the wireless device 700, a ROM (Read Only Memory) 740 for storing various programs required for performing various process and control by the CPU 730, a RAM (Random Access Memory) 750 for storing intermediate data temporarily produced in the procedure of process and control by the CPU 730, and/or a storage unit 760 for storing various programs, data and so on. The above receiver 710, processing circuitry 720, CPU 730, ROM 740, RAM 750 and/or storage unit 760 etc. may be interconnected via data and/or command bus 770 and transfer signals between one another.

Respective components as described above do not limit the scope of the present disclosure. According to one implementation of the disclosure, the functions of the above receiver 710 and processing circuitry 720 may be implemented by hardware, and the above CPU 730, ROM 740, RAM 750 and/or storage unit 760 may not be necessary. Alternatively, the functions of the above receiver 710, processing circuitry 720 may also be implemented by functional software in combination with the above CPU 730, ROM 740, RAM 750 and/or storage unit 760 etc.

In an embodiment, the data transmission resource is in a data region of a scheduling assignment period including a SA region and the data region. The processing circuitry may be operative to try to blindly decode the scheduling assignment message from the SA region first. Then the processing circuitry may be operative to blindly decode the SA message from the data region. After decoding the SA message, the data is decoded accordingly.

In another embodiment, the data transmission resource is in at least one SA period other than the first SA period. Each SA period comprises a data region, the data transmission resource in each data region is indicated by the SA message. That is, the SPS like resource allocation as described above is applied.

In a further embodiment, the processing circuitry may be operative to decode the SA message from the SA region, when it is indicated that the SA message and the data are not multiplexed through a broadcast channel, such as the PSBCH or the like, or when it is indicated that the SPS like resource allocation is not enabled through the broadcast channel.

In a further embodiment, when the SPS like resource allocation is enabled, another SA message (the normal SA message as described above) is transmitted in the first SA period. For the wireless device which has already detected the normal SA message indicating the SPS like resource allocation in the first SA period, it may not require to detect or monitor the multiplexed SA message in the following SA periods, since it already knows the SPS like transmission from beginning based on the normal SA message in the SA resource pool. For the wireless device newly joining in the following SA periods, it will firstly detect the normal SA message in the SA resource pool, and then detect the multiplexed SA message in the data resource pool as described above. Therefore, with the wireless device according to the present embodiment, the new joined wireless device can still decode data of the SPS like transmission correctly.

Figure 8:
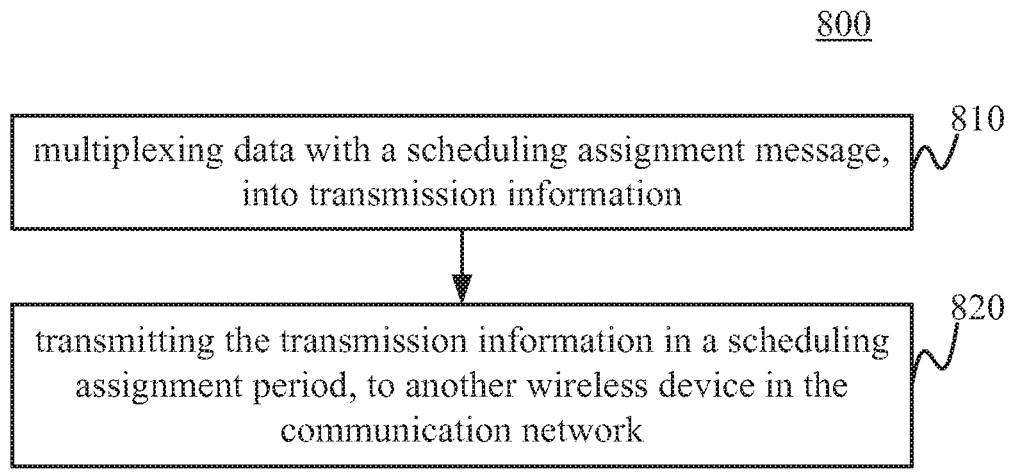
FIG. 8 is a flowchart schematically illustrating a wireless communication method according to an embodiment of the present disclosure.

FIG. 8 is a flowchart illustrating a wireless communication method 800 according to an embodiment of the present disclosure.

As shown in FIG. 8, first, at a block 810, data is multiplexed with a scheduling assignment message, into transmission information. Then, at a block 820, the transmission information is transmitted in a scheduling assignment period, to another wireless device in the communication network.

The scheduling assignment message may be used for indicating data transmission resource in the scheduling assignment period or in a previous scheduling assignment period.

The details of the wireless communication method have been described above with reference to the wireless device, and will not be repeated here.

Figure 9:
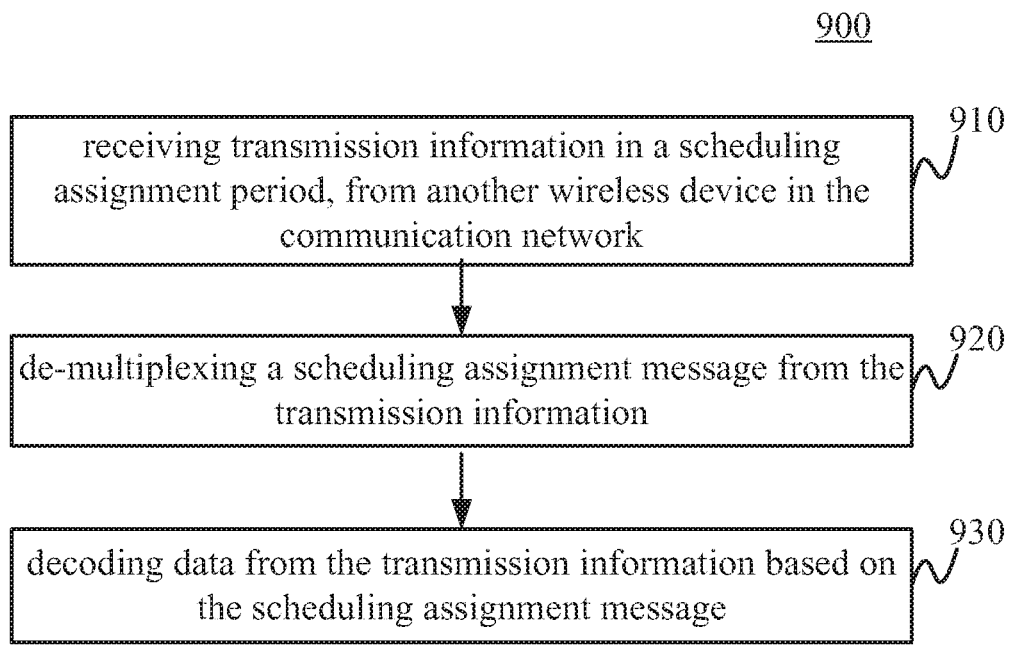
FIG. 9 is a flowchart schematically illustrating a wireless communication method according to another embodiment of the present disclosure.

FIG. 9 is a flowchart illustrating another wireless communication method 900 according to an embodiment of the present disclosure.

As shown in FIG. 9, first, at a block 910, transmission information is received in a scheduling assignment period, from another wireless device in the communication network.

Then, at a block 920, a scheduling assignment message is de-multiplexed from the transmission information, and data is decoded from the transmission information based on the scheduling assignment message, at a block 930.

The details of the wireless communication method have been described above with reference to the wireless device, and will not be repeated here.

With the wireless communication method as shown in FIG. 8 or 9, the newly joined UE will not miss any data transmitted in any SA period other than the first SA period.

The present disclosure can be realized by software, hardware, or software in cooperation with hardware. Each functional block used in the description of each embodiment described above can be realized by an LSI as an integrated circuit, and each process described in the each embodiment may be controlled by LSI. They may be individually formed as chips, or one chip may be formed so as to include a part or all of the functional blocks. They may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit or a general-purpose processor. In addition, a FPGA (Field Programmable Gate Array) that can be programmed after the manufacture of the LSI or a reconfigurable processor in which the connections and the settings of circuits cells disposed inside the LSI can be reconfigured may be used.

In a first embodiment of the present disclosure, a wireless device is provided, which is in a wireless communication network comprising multiple wireless devices capable of communicating with each other directly, the wireless device comprising: a processing circuitry operative to multiplex data with a scheduling assignment message, into transmission information; and a transmitter operative to transmit the transmission information in a scheduling assignment period, to another wireless device in the wireless communication network, wherein the scheduling assignment message is used for indicating data transmission resource in the scheduling assignment period or in a previous scheduling assignment period.

According to the wireless device in the first embodiment, the data transmission resource may be in at least one scheduling assignment period other than the first scheduling assignment period of multiple scheduling assignment periods, each of the multiple scheduling assignment periods may comprise a data region, the data transmission resource in each data region may be indicated by the scheduling assignment message.

According to the wireless device in the first embodiment, the first scheduling assignment period may comprise a scheduling assignment region in which another scheduling assignment message for assigning the data transmission resource is transmitted.

According to the wireless device in the first embodiment, said another scheduling assignment message may include a resource allocation field, a timing advance field and a time resource pattern (T-RPT) field, at least one of which is not included or is reduced in size in the scheduling assignment message.

According to the wireless device in the first embodiment, the data transmission resource may be selected by the wireless device once in the first scheduling assignment period of the multiple scheduling assignment periods, when the transmission from the wireless device to the other wireless device is scheduled by the wireless device autonomously; and the data transmission resource may be selected by a base station when the transmission from the wireless device to the other wireless device is scheduled by the base station.

According to the wireless device in the first embodiment, the transmitter may be operative to transmit the transmission information using a downlink timing which is based on reception timing from another wireless device and has not timing advance.

According to the wireless device in the first embodiment, the transmitter may be operative to transmit the transmission information in part of subframes applying time resource pattern in a scheduling assignment period, the part of subframes being specified, predefined or configured.

According to the wireless device in the first embodiment, the transmitter may be operative to transmit the transmission information in a Physical Resource Block (PRB) of the data transmission resource, an index of the PRB being associated with a T-RPT index of the data transmission resource; or the transmitter may be operative to transmit the transmission information in a fixed PRB of the data transmission resource.

According to the wireless device in the first embodiment, the processing circuitry may multiplex the scheduling assignment message with data into transmission information in anyone of the following ways: the processing circuitry embeds the resource elements of scheduling assignment message into the data resource in a physical layer, to form the transmission information, in which relevant resource elements of data resource is punctured; the processing circuitry maps the scheduling assignment message into a part of the data transmission resource, and maps the data into the other part of the data transmission resource, to form the transmission information, in which a coding rate of the data is matched within the other part transmitting the data.

According to a second embodiment of the present disclosure, a wireless device is provided, which is in a communication network comprising multiple wireless devices capable of communicating with each other directly, the wireless device comprising: a receiver operative to receive transmission information in a scheduling assignment period, from another wireless device in the communication network; and a processing circuitry operative to de-multiplex a scheduling assignment message from the transmission information, and to decode data from the transmission information based on the scheduling assignment message, wherein the scheduling assignment message is used for indicating data transmission resource in the scheduling assignment period or in a previous scheduling assignment period.

According to the wireless device in the second embodiment, the data transmission resource may be in a data region of a scheduling assignment period including a scheduling assignment region and the data region; the processing circuitry may be operative to try to blindly decode the scheduling assignment message from the scheduling assignment region first; then the processing circuitry may be operative to blindly decode the scheduling assignment message from the data region.

According to the wireless device in the second embodiment, the processing circuitry may decode the scheduling assignment message from the scheduling assignment region, when it is indicated that the scheduling assignment message and the data are not multiplexed through a broadcast channel transmitted by another wireless device in the wireless communication network.

According to the wireless device in the second embodiment, the data transmission resource may be in at least one scheduling assignment period other than the first scheduling assignment period of multiple scheduling assignment periods, each of the multiple scheduling assignment periods may comprise a data region, the data transmission resource in each data region may be indicated by the scheduling assignment message.

According to a third embodiment of the present disclosure, a wireless communication method is provided, which is applied to a wireless device in a wireless communication network comprising multiple wireless devices capable of communicating with each other directly, the communication method comprising: multiplexing data with a scheduling assignment message, into transmission information; and transmitting the transmission information in a scheduling assignment period, to another wireless device in the communication network, wherein the scheduling assignment message is used for indicating data transmission resource in the scheduling assignment period or in a previous scheduling assignment period.

According to a fourth embodiment of the present disclosure, a wireless communication method is provided, which is applied to a wireless device in a wireless communication network comprising multiple wireless devices capable of communicating with each other directly, the communication method comprising: receiving transmission information in a scheduling assignment period, from another wireless device in the communication network; de-multiplexing a scheduling assignment message from the transmission information, and decoding data from the transmission information based on the scheduling assignment message, wherein the scheduling assignment message is used for indicating data transmission resource in the scheduling assignment period or in a previous scheduling assignment period.

According to a fifth embodiment of the present disclosure, a wireless device is provided, which is in a wireless communication network comprising multiple wireless devices capable of communicating with each other directly, the wireless device comprising: a transmitter operative to transmit a scheduling assignment message in a scheduling assignment region of a first scheduling assignment period of multiple scheduling assignment periods, to another wireless device in the wireless communication network, wherein the scheduling assignment message is used for indicating data transmission resource in each scheduling assignment period.

According to a sixth embodiment of the present disclosure, a wireless device is provided, which is in a wireless communication network comprising multiple wireless devices capable of communicating with each other directly, the wireless device comprising: a receiver operative to receive a scheduling assignment message in a scheduling assignment region of a first scheduling assignment period of multiple scheduling assignment periods, from another wireless device in the wireless communication network, wherein the scheduling assignment message is used for indicating data transmission resource in each scheduling assignment period.

According to a seventh embodiment of the present disclosure, a wireless communication method is provided, which is applied to a wireless device in a wireless communication network comprising multiple wireless devices capable of communicating with each other directly, the wireless communication method comprising: transmitting a scheduling assignment message in a scheduling assignment region of a first scheduling assignment period of multiple scheduling assignment periods, to another wireless device in the wireless communication network, wherein the scheduling assignment message is used for indicating data transmission resource in each scheduling assignment period.

According to an eighth embodiment of the present disclosure, a wireless communication method is provided, which is applied to a wireless device in a wireless communication network comprising multiple wireless devices capable of communicating with each other directly, the wireless communication method comprising: receiving a scheduling assignment message in a scheduling assignment region of a first scheduling assignment period of multiple scheduling assignment periods, from another wireless device in the wireless communication network, wherein the scheduling assignment message is used for indicating data transmission resource in each scheduling assignment period.

In addition, embodiments of the present disclosure can also provide an integrated circuit which comprises module(s) for performing the step(s) in the above respective communication methods. Further, embodiments of the present can also provide a computer readable storage medium having stored thereon a computer program containing a program code which, when executed on a computing device, performs the step(s) of the above respective communication methods.

It is noted that the present disclosure intends to be variously changed or modified by those skilled in the art based on the description presented in the specification and known technologies without departing from the content and the scope of the present disclosure, and such changes and applications fall within the scope that claimed to be protected. Furthermore, in a range not departing from the content of the disclosure, the constituent elements of the above-described embodiments may be arbitrarily combined.

What is claimed is:

1. A wireless communication apparatus, comprising:
a processing circuit which, in operation, maps a scheduling assignment message into one or more resources; and
a transmitter which, in operation, transmits the scheduling assignment message in the one or more resources, where:
in a case that the scheduling assignment message is mapped into the one or more resources within a same subframe where data of a sidelink transmission is transmitted, no timing advanced field is included in the scheduling assignment message, and
in a case that the scheduling assignment message is not mapped into the one or more resources within a same subframe where the data of a sidelink transmission is transmitted, a timing advanced field is included in the scheduling assignment message.

2. The wireless communication apparatus according to claim 1, wherein the same subframe is defined based on a semi-persistent scheduling (SPS) mechanism.

3. The wireless communication apparatus according to claim 1, wherein whether the same subframe is defined based on a semi-persistent scheduling (SPS) mechanism is indicated by the scheduling assignment message using a Radio Network Temporary Identity (RNTI).

4. The wireless communication apparatus according to claim 1, wherein the transmitter transmits the scheduling assignment message using a transmission timing, which is based on a reception timing from a base station, in the case that the scheduling assignment message is mapped into the one or more resources within the same subframe.

5. The wireless communication apparatus according to claim 1, wherein the scheduling assignment message is mapped in multiple Physical Resource Blocks (PRBs) in the same subframe in the case that the scheduling assignment message is mapped into the one or more resources within the same subframe.

6. The wireless communication apparatus according to claim 5, wherein the multiple PRBs in the same subframe use different frequencies.

7. The wireless communication apparatus according to claim 1, wherein the same subframe is indicated by a bitmap signaling, wherein each bit of the bitmap shows whether each corresponding subframe is set for the sidelink transmission.

8. The wireless communication apparatus according to claim 7, wherein an identical pattern based on the bitmap signaling is repeated for subframes over the length of the bitmap.

9. A wireless communication method, comprising:
mapping a scheduling assignment message into one or more resources; and
transmitting the scheduling assignment message in the one or more resources, wherein:
in a case that the scheduling assignment message is mapped into the one or more resources within a same subframe where data of a sidelink transmission is transmitted, no timing advanced field is included in the scheduling assignment message, and
in a case that the scheduling assignment message is not mapped into the one or more resources within a same subframe where the data of a sidelink transmission is transmitted, a timing advanced field is included in the scheduling assignment message.

10. The wireless communication method according to claim 9, wherein the same subframe is defined based on a semi-persistent scheduling (SPS) mechanism.

11. The wireless communication method according to claim 9, wherein whether the same subframe is defined based on a semi-persistent scheduling (SPS) mechanism is indicated by the scheduling assignment message using a Radio Network Temporary Identity (RNTI).

12. The wireless communication method according to claim 9, wherein the scheduling assignment message is transmitted using a transmission timing, which is based on a reception timing from a base station, in the case that the scheduling assignment message is mapped into the one or more resources within the same subframe.

13. The wireless communication method according to claim 9, wherein the scheduling assignment message is mapped in multiple Physical Resource Blocks (PRBs) in the same subframe in the case that the scheduling assignment message is mapped into the one or more resources within the same subframe.

14. The wireless communication method according to claim 13, wherein the multiple PRBs in the same subframe use different frequencies.

15. The wireless communication method according to claim 9, wherein the same subframe is indicated by a bitmap signaling, wherein each bit of the bitmap shows whether each corresponding subframe is set for the sidelink transmission.

16. The wireless communication method according to claim 15, wherein an identical pattern based on the bitmap signaling is repeated for subframes over the length of the bitmap.

* * * * *